United States Patent [19]

Leonard

[11] 4,305,814

[45] Dec. 15, 1981

[54] ENERGY EFFICIENT PROCESS FOR SEPARATING HYDROCARBONACEOUS MATERIALS INTO VARIOUS FRACTIONS

[75] Inventor: Robert E. Leonard, Oklahoma City, Okla.

[73] Assignee: Kerr-McGee Refining Corporation, Oklahoma City, Okla.

[21] Appl. No.: 164,592

[22] Filed: Jun. 30, 1980

[51] Int. Cl.$^3$ ............................................... C10C 3/00
[52] U.S. Cl. ...................................... 208/309; 208/45
[58] Field of Search .......................... 208/309, 312, 45

[56] References Cited

U.S. PATENT DOCUMENTS

| | | | |
|---|---|---|---|
| 2,500,757 | 3/1950 | Kiersted | 208/45 |
| 2,940,920 | 6/1960 | Garwin | 208/309 |
| 3,775,292 | 11/1973 | Watkins | 208/309 |
| 3,830,732 | 8/1974 | Gatsis | 208/309 |
| 4,124,286 | 11/1978 | Nolley | 208/309 |
| 4,125,459 | 11/1978 | Garwin | 208/309 |
| 4,214,975 | 7/1980 | Davis | 208/309 |
| 4,239,616 | 12/1980 | Gearhart | 208/309 |

Primary Examiner—Brian E. Hearn
Attorney, Agent, or Firm—William G. Addison

[57] ABSTRACT

An energy efficient process for separating a hydrocarbonaceous material into various fractions. The hydrocarbonaceous material is admixed with a solvent and the mixture is introduced into a first separation zone maintained at an elevated first temperature and pressure. The feed mixture separates into a first light phase comprising solvent and at least a portion of the lightest hydrocarbonaceous material and a first heavy phase comprising the remainder of the hydrocarbonaceous material and some solvent. The first heavy phase is introduced into a second separation zone maintained at a second temperature level above the first temperature level and at an elevated pressure. The first heavy phase separates into a second light phase comprising solvent and a second heavy phase comprising at least a portion of the hydrocarbonaceous material. The separated hydrocarbonaceous material fractions are recovered.

16 Claims, 1 Drawing Figure

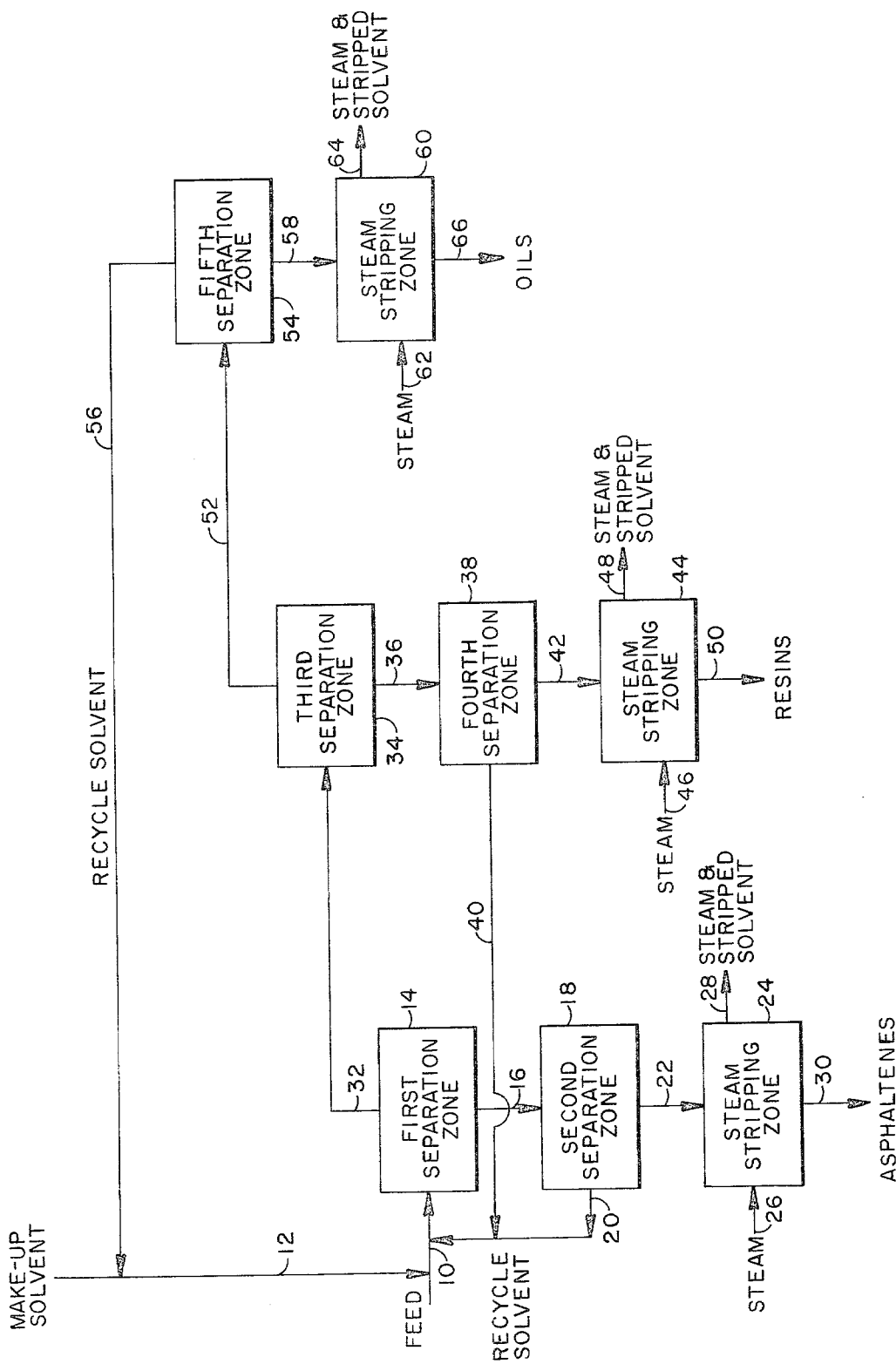

ENERGY EFFICIENT PROCESS FOR SEPARATING HYDROCARBONACEOUS MATERIALS INTO VARIOUS FRACTIONS

FIELD OF THE INVENTION

This invention relates to a process for separating a hydrocarbon feed into various fractions employing solvents at elevated temperatures and pressures. More particularly, this invention relates to an energy efficient process for recovering the solvent from the separated fractions.

BRIEF DESCRIPTION OF THE PRIOR ART

Numerous methods for extracting various fractions from hydrocarbon materials have been disclosed in the prior art. U.S. Pat. No. 2,115,003 discloses one such process. That patent discloses treatment of heavy hydrocarbon oils with selected light hydrocarbon solvents to separate a light oil fraction. The heavy hydrocarbon oils are contacted with the solvent and introduced into a first separation zone. The solvent causes the rejection of asphaltene and resin bodies from the oil which then settle as a sludge within the separation zone. The sludge of asphaltene and resin material, containing some solvent, is withdrawn from the separation zone and introduced into a distillation zone to recover the solvent contained therein. The light oils, along with a substantial portion of the solvent, are withdrawn from the separation zone, heated to a temperature above that existing in the first separation zone, and introduced into a second separation zone. In the second separation zone, the light oils separate from the solvent as a heavy phase. The second heavy phase then is withdrawn from the second separation zone and the remaining solvent is recovered therefrom by distillation. The second light fraction comprising a substantial portion of the solvent is withdrawn from the second separation zone and recycled to contact additional heavy hydrocarbon oils.

U.S. Pat. No. 2,500,757 discloses a process for separating a heavy hydrocarbon oil into asphaltene, resin and oil fractions. The heavy hydrocarbon oil is contacted with from about 5 to 9 volumes of solvent per volume of feed and introduced into a first separation zone maintained at a temperature of from about 135 degress F. to about 155 degrees F. In the first separation zone, the heavy hydrocarbon oil separates into two phases, a light phase comprising oil, resin and solvent and a heavy phase comprising asphaltenes and some solvent. The light phase is withdrawn from the first separation zone, heated to a temperature of from about 155 degrees F. to about 165 degrees F. and introduced into a second separation zone wherein the resinous material separates and collects as a second heavy phase. The second heavy phase is withdrawn from the second separation zone and recycled to admix with the feed to the first separation zone. The first heavy phase is withdrawn from the first separation zone and introduced into a third separation zone maintained at a temperature of from about 125 degrees F. to about 135 degrees F. The first heavy phase separates into a third light phase comprising oils and solvent and a third heavy phase comprising asphaltenes, some oils and some solvent. The third light phase is recycled to admix with the feed to the first separation zone. The third heavy phase is withdrawn, contacted with an additional quantity of solvent to provide a volume ratio of solvent to asphaltenes of from about 20:1 to about 40:1 and then introduced into a fourth separation zone. The fourth separation zone is maintained at a temperature of from about 120 degrees F. to about 130 degrees F. to effect a separation of the remaining oils from the asphaltenes. The separated oil phase is withdrawn from the fourth separation zone and recycled to admix with the first heavy phase introduced into a third separation zone. The various recycle streams improve the yield of recovered oils while also reducing the total quantity of solvent necessary to achieve the improved yield.

U.S. Pat. No. 3,775,292 discloses a process for solvent deasphalting, deresining and multistage hydrocracking of a sulfurous, heavy hydrocarbon into lower-boiling hydrocarbon products of reduced sulfur concentration. The hydrocarbon charge stock is contacted with a solvent and introduced into a first extraction zone maintained under conditions selected to provide a solvent-lean asphaltic pitch and a solvent-rich deasphalted liquid phase. The liquid phase is withdrawn from the first extraction zone and introduced into a second extraction zone maintained under conditions to provide a solvent-lean resin concentrate and a deresined second liquid phase. A portion of the resin concentrate then is reached with hydrogen in a first catalytic reaction zone under conditions selected to convert the resins into lower-boiling hydrocarbons. A portion of the first reactor zone effluent then is mixed with a portion of the deresined second liquid phase and introduced into a second catalytic reaction zone along with hydrogen to produce additional lower-boiling hydrocarbons. The lower-boiling hydrocarbons then are recovered.

U.S. Pat. No. 3,830,732 discloses a process for separating an asphaltene-containing charge stock into several fractions. The charge stock is contacted with a first solvent in a first separation zone at a solvent to charge stock volumetric ratio of less than about 4:1 to provide a first solvent-rich liquid phase and a first solvent-lean liquid phase comprising asphaltenes and resins. The solvent-lean liquid phase then is contacted with a second solvent having at least one more carbon atom per molecule than the first solvent in a second separation zone. The solvent to charge stock volumetric ratio is greater than the ratio in the first separation zone and the temperature level is maintained below the temperature level in the first separation zone. The solvent-lean liquid phase is caused to separate into a substantially asphaltene-free, resin-containing second solvent-rich liquid phase and an asphaltene-containing second solvent-lean liquid phase. Deasphalted oil then is recovered as the light phase of the first and second separation zones.

U.S. Pat. No. 4,124,486 discloses an improved process for separating a deasphalted oil from a heavy hydrocarbon charge stock. The charge stock is contacted with a select solvent and introduced into a deasphalting tower to precipitate asphaltic material and provide a solvent-deasphalted oil mixture. The mixture is introduced into a first separation zone that functions at substantially the same pressure as the deasphalting tower and at a temperature above the critical temperature of the solvent. This produces a first solvent-rich vapor phase and a first solvent-lean deasphalted oil phase. The deasphalted phase is increased in temperature and introduced into a second separation zone at substantially the same pressure to provide a second solvent-rich vapor and a second solvent-lean liquid phase of deasphalted oil. The first and second vapor phases are combined and introduced into a third separation zone maintained at a temperature and pressure below that of the first separation zone to provide a solvent concentrate and a low-boiling hydrocarbons phase. The solvent concentrate is introduced into a solvent fractionation zone and then recycled. Solvent remaining with the deasphalted oil is recovered by steam stripping.

While each of the prior art processes have provided various benefits in separating hydrocarbonaceous materials, it still is desirable to provide greater energy efficiency in the processes.

SUMMARY OF THE INVENTION

The present invention provides a process for separating a hydrocarbonaceous material into several fractions while reducing the total quantity of energy necessary to effect the separations in comparison to that required by other known processes.

Initially, the hydrocarbonaceous material comprising asphaltenes, resins and oils and a solvent are introduced into a first separation zone. The first separation zone is maintained at an elevated temperature and pressure to effect a separation of the mixture of hydrocarbonaceous material and solvent into a fluid-like first light phase comprising oils, resins and solvent and a fluid-like first heavy phase comprising asphaltenes and some solvent. The first heavy phase then is introduced into a second separation zone maintained at a temperature level above the temperature level in the first separation zone and at substantially the same pressure level. The heavy phase separates into a second light phase comprising solvent and a second heavy phase comprising an asphaltene concentrate. The second light phase is withdrawn for recycle to the first separation zone without substantial temperature or pressure reduction. The asphaltene concentrate is withdrawn and flashed to form at least one stream comprising vaporized solvent and one other stream comprising asphaltenes. The vaporized solvent is condensed and recycled to the first separation zone. Steam stripping may be used to recover any remaining residual solvent in the asphaltenes for eventual recycle in the process.

The first light phase is introduced into a third separation zone maintained at a temperature level above the temperature level in the first separation zone and preferably at substantially the same pressure level as the first separation zone. The first light phase separates into a third light phase comprising oils and solvent and a third heavy phase comprising resins and some solvent. The third heavy phase then is introduced into a fourth separation zone maintained at a temperature level above the temperature level in the third separation zone and preferably at substantially the same pressure level as the third separation zone. The heavy phase separates into a fourth light phase comprising solvent and a fourth heavy phase comprising a resin concentrate. The fourth light phase is withdrawn for recycle to the first separation zone. The resin concentrate is withdrawn and flashed to form at least one stream comprising vaporized solvent and one other stream comprising resins. The vaporized solvent is condensed and recycled in the process. Any remaining residual solvent in the resins can be recovered by, for example, steam stripping.

The third light phase is introduced into a fifth separation zone maintained at a temperature level above the temperature level in the third separation zone and at substantially the same pressure. The third light phase is caused to separate within the fifth separation zone into a fifth light phase comprising solvent and a fifth heavy phase comprising oils. The fifth light phase is withdrawn for recycle in the process without temperature or pressure reduction. The fifth heavy phase is withdrawn and flashed to form at least one stream comprising vaporized solvent and one other stream comprising oils. Any remaining residual solvent in the oils can be recovered by, for example, steam stripping.

The separation of the solvent from the asphaltenes and resins while at an elevated temperature and pressure permits that portion of the solvent to be directly recycled without a substantial loss or use of energy, such as the loss of heat of vaporization energy or the need for pumping or compressing which require mechanical energy, which is required if the bulk of the solvent is recovered at a low pressure level after flashing.

BRIEF DESCRIPTION OF THE DRAWINGS

The single FIGURE provides a schematic diagrammatic illustration of the process of the present invention.

DESCRIPTION OF THE PREFERRED EMBODIMENT

Turning now to the drawing, a hydrocarbonaceous feed comprising, for example, crude oil residuum, topped crude oils, atmospheric tower bottoms products, vacuum bottoms or the like generally containing asphaltenes, resins and oils is pumped (pump not shown) through a conduit 10 and contacted with a solvent at elevated pressure and temperature which is introduced through a conduit 12. The mixture is introduced into a first separation zone 14. Sufficient solvent is introduced into conduit 10 to provide a ratio by volume of solvent to feed in the range of from about 2:1 to about 20:1 and preferably in the range of from about 8:1 to about 12:1. It is to be understood that larger quantities of solvent can be used, but such use is unnecessary.

To facilitate an understanding of the process of the present invention, and not by way of limitation, hereinafter specific reference will be made to a hydrocarbonaceous feed comprising a vacuum residuum containing asphaltenes, resins and oils.

The first separation zone 14 is maintained at an elevated temperature and pressure to effect a separation of the feed mixture into a fluid-like first light phase comprising oils, resins and solvent and a fluid-like first heavy phase comprising asphaltenes and some solvent. More particularly, first separation zone 14 is maintained at a temperature level in the range of from about 150 degrees F. to above the critical temperature of the solvent. The pressure level of first separation zone 14 is maintained at least equal to the vapor pressure of the solvent when zone 14 is maintained at a temperature below the critical temperature of the solvent and at least equal to the critical pressure of the solvent when maintained at temperatures equal to or above the critical temperature of the solvent.

The first heavy phase is withdrawn from first separation zone 14 and introduced into a second separation zone 18 through a conduit 16. Second separation zone 18 is maintained at a temperature level above the temperature level in first separation zone 14 and at an elevated pressure level which preferably is substantially the same pressure level as in first separation zone 14. Preferably, the temperature level is above the critical temperature of the solvent.

The first heavy phase is caused to separate within second separation zone 18 through control of the temperature and pressure conditions into a second light phase comprising solvent and a fluid-like second heavy phase comprising an asphaltene concentrate. The second light phase is withdrawn from second separation zone 18 through a conduit 20 and recycled to contact the feed in conduit 10 without a substantial change in temperature or pressure. It is understood, of course that the temperature level of the solvent in conduit 20 normally will decrease upon contact with the feed in conduit 10 which normally is at a lower temperature than the solvent.

The second heavy phase is withdrawn from second separation zone 18 through a conduit 22 and introduced into a steam stripping zone 24.

Steam stripping zone 24 is maintained at a pressure level substantially below the pressure level of second separation zone 18. The pressure level of the second heavy phase can be reduced by passage through a pressure reduction valve (not shown) interposed in conduit 22. Preferably, the pressure level is reduced to less than 50 psig. and most preferably to about atmospheric pressure. The pressure reduction results in flashing of at least a portion of the residual solvent contained in the asphaltene concentrate. The remaining solvent is recovered from the asphaltene concentrate by contact with steam introduced through a conduit 26. The steam and stripped solvent are withdrawn from steam stripping zone 24 through a conduit 28 and then treated by methods (not shown) well known to those skilled in the art to separate and recover the solvent from the water. The solvent recovered from the stripping zone then can be compressed or condensed and pumped back into the process apparatus along with the recycle and make-up solvent introduced through conduit 12. The asphaltenes which collect within steam stripping zone 24 are withdrawn through a conduit 30 as a product.

The first light phase is passed from first separation zone 14 through a conduit 32 and introduced into a third separation zone 34. In one particular embodiment, third separation zone 34 is maintained at a temperature level higher than the temperature level in first separation zone 14 and at an elevated pressure to effect a separation of the first light phase into a fluid-like third light phase comprising oils and solvent and a fluid-like third heavy phase comprising resins and some solvent.

The third separation zone 34 is maintained at a temperature level in the range of from about 2 degrees F. above the temperature level in first separation zone 14 to above the critical temperature of the solvent. The pressure level of third separation zone 34 is maintained at least equal to the vapor pressure of the solvent when zone 34 is maintained at a temperature below the critical temperature of the solvent and at least equal to the critical pressure of the solvent when maintained at a temperature equal to or above the critical temperature of the solvent. The pressure level can be substantially the same pressure level as is maintained in first separation zone 14.

The third heavy phase is withdrawn from third separation zone 34 through a conduit 36 and introduced into a fourth separation zone 38. The fourth separation zone 38 is maintained at a temperature level above the temperature level in third separation zone 34 and at an elevated pressure which preferably is substantially the same pressure level as in third separation zone 34 to effect a separation of the third heavy phase into a fourth light phase comprising solvent and a fourth fluid-like heavy phase comprising a resin concentrate. The fourth light phase then is passed from fourth separation zone 38 through a conduit 40 for recycle in the process, for example, to contact fresh feed in conduit 10 without a substantial reduction in temperature or pressure. The temperature level of the solvent in conduit 40 may decrease upon contact with the feed in conduit 10. The fourth heavy phase is withdrawn from fourth separation zone 38 through a conduit 42 and introduced into a steam stripping zone 44.

Steam stripping zone 44 is maintained at a pressure level substantially below the pressure level of fourth separation zone 38. Preferably, the pressure level is less than about 50 psig. and most preferably at about atmospheric pressure. The reduction in pressure of the fourth heavy phase can be effected in the same manner as previously described for steam stripping zone 24. Steam is introduced into stripping zone 44 through a conduit 46 to contact the resin concentrate and recover solvent therefrom. The steam and stripped solvent are withdrawn from stripping zone 44 through a conduit 48 for treatment to recover the solvent from the mixture. Preferably, the treatment is the same as that for the stripped solvent in conduit 28 and most preferably the streams in conduits 28 and 48 are combined for treatment. The resins which remain within steam stripping zone 44 are withdrawn through a conduit 50 as a product.

The third light phase then is passed from third separation zone 34 through a conduit 52 and introduced into a fifth separation zone 54. In one particular embodiment, fifth separation zone 54 is maintained at a temperature level higher than the temperature level in third separation zone 34 and at an elevated pressure to effect a separation of the third light phase into a fifth light phase comprising solvent and a fifth heavy phase comprising oils and some residual solvent.

The fifth light phase then is passed from fifth separation zone 544 through a conduit 56 and recycled to contact fresh feed in conduit 10.

The fifth heavy phase is withdrawn from fifth separation zone 54 through a conduit 58 and introduced into a steam stripping zone 60. Steam stripping zone 60 is maintained at a pressure level substantially below the pressure level of fifth separation zoe 54. Preferably the pressure level is below about 50 psig. and most preferably at about atmospheric pressure. The reduction in pressure of the fifth heavy phase can be effected as in steam stripping zones 24 and 44. Steam is introduced into stripping zone 60 through a conduit 62 to conttact the oils and recover solvent therefrom. The steam and stripped solvent are withdrawn from stripping zone 60 through a conduit 64. Advantageously, the stream flowing through conduit 64 is combined with those in conduits 28 and 48 for treatment. The oils which remain within steam stripping zone 44 are withdrawn through a conduit 66 as a product.

In an alternate embodiment of the present invention (not shown), at least a portion of the solvents separated in second separation zone 18 as the second light phase can be admixed with the first light phase in conduit 32 before separation of the first light phase in third separation zone 34. The presence of the additional solvent increases the solvent to feed ratio in third separation zone 34. Such an increase has been found in some instances to enhance the fractionation capability of third separation zone 34 and subsequent separation zones. The second light phase also can be admixed with the third light phase in conduit 52 before separation of the third light phase in fifth separation zone 54.

In yet another embodiment of the present invention (not shown), at least a portion of the solvent separated in fourth separation zone 38 can be admixed with the first light phase or the third light phase before additional separations of the respective phases are effected. In addition to the enhanced separations that can be effected in some instances, the interstage recycle of the solvent provides a process having improved energy efficiency. The recycled solvent can be at or above the pressure of the stream with which it is admixed. This reduces the quantity of energy required to pump or compress the solvent. The recycle solvent also is at an elevated temperature which substantially reduces the quantity of energy required to heat the recycled solvent to the necessary operating conditions of the various separation zones.

To further illustrate the process of the present invention, and not by way of limitation, the following example is provided.

EXAMPLE

In a first test, performed in accordance with known prior art methods, a feed comprising a vacuum tower bottoms containing asphaltenes, resins and oils is contacted with hot pressurized solvent comprising pentane in a ratio by volume of solvent to feed of about 12:1 to form a mixture. The mixture is introduced into first separation zone 14 at a rate of about 60,000 barrels per day. First separation zone 14 is maintained at a temperature of about 425 degrees F. and a pressure of about 650 psig. to effect a separation of the mixture into a first light phase and a first heavy phase.

The first heavy phase (comprising asphaltenes and some solvent) is withdrawn from first separation zone 14, reduced in pressure to about atmospheric pressure by flashing and introduced into a steam stripping zone. The solvent is stripped from the asphaltenes, condensed in an air cooler and recycled to contact additional feed for introduction into first separation zone 14. Because of the low condensation temperature of pentane, the latent heat of condensation can not readily be used to provide energy for the process.

The energy required to pump and heat this solvent back to the operating conditions of first separation zone 14 is about 1.8 million Btu/hr.

The first light phase is withdrawn fron first separation zone 14 and introduced into another separation zone maintained at a temperature of about 430 degrees F. and at substantially the same pressure as first separation zone 14. The first light phase separates into another light phase and a heavy phase comprising resins and some solvent. The heavy phase is withdrawn from the separation zone, reduced in pressure by flashing to about atmospheric pressure and introduced into a steam stripping zone. The solvent is condensed in an air cooler and recycled to contact additional feed.

The energy required to pump and heat this solvent back to the operating conditions of first separation zone 14 is about 1.8 million Btu/hr. The total energy required to recycle the solvent from the separated asphaltenes and resins is about 3.6 million Btu/hr.

In a second test, performed in accordance with the process of the present invention, the feed is contacted with solvent and separated within first separation zone 14 under the conditions of temperature and pressure previously described.

The first heavy phase is withdrawn from first separation zone 14 and introduced into second separation zone 18 at substantially the same pressure. Second separation zone 18 is maintained at a temperature of about 460 degrees F. The first heavy phase separates into a second light phase comprising solvent and a second heavy phase comprising an asphaltene concentrate. The second light phase is withdrawn and recycled to contact additional feed. The second heavy phase is withdrawn, flashed to about atmospheric pressure and introduced into a steam stripping zone to recover residual solvent. This solvent also is recycled to contact additional feed. The heating necessary to effect the separation within second separation zone 18 requires only about 0.34 million Btu/hr. The energy required to pump and heat all of the separated solvent back to the operating conditions of first separation zone 14 is about 1.1 million Btu/hr.

The first light phase is withdrawn and introduced into third separation zone 34 at substantially the same pressure as first separation zone 14 and a temperature of about 430 degrees F. The first light phase separates into a third light phase and a third heavy phase comprising resins and some solvent. The third heavy phase is withdrawn and introduced into fourth separation zone 38 at substantially the same pressure as third separation zone 34. Fourth separation zone 38 is maintained at a temperature level of about 465 degrees F. The third heavy phase separates into a fourth light phase comprising solvent and a fourth heavy phase comprising a resin concentrate. The fourth light phase is withdrawn and recycled to contact additional feed. The fourth heavy phase is withdrawn, flashed to about atmospheric pressure and introduced into a steam stripping zone to recover residual solvent. This solvent also is recycled to contact additional feed. The heating necessary to effect the separation within fourth separation zone 38 requires only about 0.31 million Btu/hr. The energy required to pump and heat all of the separated solvent back to the operating conditions of first separation zone 14 is about 1.1 million Btu/hr.

The total energy required to recover and recycle the solvent from the separated asphaltenes and resins is about 2.85 million Btu/hr which includes about 0.65 million Btu/hr which could be considered a replacement for other heat inputs. This is less than about 80 percent of the energy required by the prior art method of flashing the first and third heavy phases directly to a reduced pressure to recover the solvent associated therewith.

The results of the tests clearly illustrate the beneficial energy savings which result from the practice of the present invention over the known prior art method to process equivalent quantities of hyrocarbonaceous material.

In an alternate embodiment of the present invention also illustrated by the drawing, the hydrocarbonaceous material-solvent mixture introduced into first separation zone 14 is separated into a first light phase comprising solvent and at least a portion of the lightest hydrocarbonaceous material and a first heavy phase comprising the remainder of the hydrocarbonaceous material and some solvent. Thus, if the feed is vacuum bottoms comprising asphaltenes, resins and oils, the mixture introduced into first separation zone 14 can be caused to separate into a first light phase comprising oils and solvent and a first heavy phase comprising asphaltenes, resins and some solvent by selecting particular temperature and pressure levels within first separation zone 14.

The first heavy phase then is withdrawn as previously described and introduced into the second separation zone 18 which is maintained at a temperature level above the temperature level of the first separation zone and at an elevated pressure level. Preferably, the pressure level is above the critical pressure of the solvent. The first heavy phase is caused to separate into a second light phase comprising solvent and a second heavy phase comprising at least a portion of the hydrocarbonaceous material feed. If the first heavy phase comprised asphaltenes, resins and some solvent, the second heavy phase would comprise asphaltenes and resins and a lesser quantity of solvent.

The separated second light phase can be withdrawn from the second separation zone 18 and recycled in the process to contact fresh hydrocarbonaceous material at substantially the same pressure level as that existing within second separation zone 18.

The first light phase and second heavy phase can be recovered for recycle in the process of the present invention or for use as feed to other treatment processes, fuels or the like.

The term "solvent" means a fluid comprising at least one member selected from the group consisting of aromatic hydrocarbons having normal boiling points below about 350 degrees F. such as benzene, toluene, o-, m- and p-xylene and isopropyl benzene; paraffin hydrocarbons containing from 3 through 9 carbon atoms, such as propane, butane, pentane, hexane, heptane, octane, nonane and their isomers; and mono-olefin hydrocarbons containing from 4 through 8 carbon atoms, such as butene, pentene, hexene, heptene and octene and other similar fluids such as alcohols containing from 3 through 9 carbon atoms and the like.

The term "substantially the same pressure level" means that the pressure imposed upon a downstream treatment zone or conduit is the same as that imposed upon the treatment zone immediately upstream, allowing for the normal pressure drop experienced as a result of fluid flow through the system.

While the present invention has been described with respect to what at present are the preferred embodiments thereof, it will be understood, of course, that certain changes, substitutions, modifications and the like can be made therein without departing from its true scope as defined in the appended claims.

What is claimed is:

1. A process comprising:
   introducing a hydrocarbonaceous material feed and a solvent into a first separation zone maintained at an elevated temperature level and pressure level to effect a separation of the mixture into a first light phase comprising solvent and at least a portion of the hydrocarbonaceous material and a first heavy phase comprising the remainder of the hydrocarbonaceous material feed and some solvent;
   introducing said first heavy phase into a second separation zone maintained at a temperature level above the temperature level in the first separation zone and at an elevated pressure level to effect a separation of said first heavy phase into a second light phase comprising solvent and a second heavy phase comprising at least a portion of the hydrocarbonaceous material feed;
   withdrawing said second light phase from the second separation zone for recycle without substantial pressure reduction to said first separation zone to provide at least a portion of the solvent introduced therein; and
   recovering said first light phase and second heavy phase.

2. The process of claim 1 wherein the first separation zone is maintained at a temperature level of from about 150 degrees F. to above the critical temperature of the solvent and a pressure level at least equal to the vapor pressure of the solvent when at a temperature below the critical temperature of the solvent and at least equal to the critical pressure of the solvent when at a temperature equal to or above the critical temperature of the solvent.

3. The process of claim 1 wherein the solvent comprises at least one member selected from the group consisting of paraffinic hydrocarbons containing from 3 through 9 carbon atoms, mono-olefin hydrocarbons containing from 4 through 8 carbon atoms, aromatic hydrocarbons having a normal boiling point temperature below about 350 degrees F. and alcohols containing from 3 through 9 carbon atoms.

4. The process of claim 1 wherein the pressure level in the second separation zone is substantially the same pressure level as in the first separation zone.

5. A process comprising:
   introducing a hydrocarbonaceous material feed comprising asphaltenes, resins and oils and a solvent into a first separation zone maintained at an elevated temperature level and pressure level to effect a separation of the mixture into a first light phase and a first heavy phase comprising asphaltenes and some solvent;
   introducing said first heavy phase into a second separation zone maintained at a temperature level above the temperature level in the first separation zone and at an elevated pressure level to effect a separation of said first heavy phase into a second light phase comprising solvent and a second heavy phase comprising asphaltenes;
   withdrawing said second light phase from the second separation zone for recycle without substantial pressure reduction to said first separation zone to provide at least a portion of the solvent introduced therein; and
   recovering the first light phase and second heavy phase.

6. The process of claim 5 wherein the first separation zone is maintained at a temperature level of from about 150 degrees F. to above the critical temperature of the solvent and a pressure level at least equal to the vapor pressure of the solvent when at a temperature below the critical temperature of the solvent and at least equal to the critical pressure of the solvent when at a temperature equal to or above the critical temperature of the solvent.

7. The process of claim 5 wherein the solvent comprises at least one member selected from the group consisting of paraffinic hydrocarbons containing from 3 through 9 carbon atoms, mono-olefin hydrocarbons containing from 4 through 8 carbon atoms, aromatic hydrocarbons having a normal boiling point temperature below about 350 degrees F. and alcohols containing from 3 through 9 carbon atoms.

8. The process of claim 5 wherein the pressure level in the second separation zone is substantially the same pressure level as in the first separation zone.

9. A process comprising:

introducing a hydrocarbonaceous material feed and a first portion of a solvent into a first separation zone maintained at an elevated temperature and pressure to effect a separation of the mixture into a first light phase comprising solvent and at least a portion of the hydrocarbonaceous material feed and some solvent;

introducing said first heavy phase into a second separation zone maintained at a temperature level above the temperature level in the first separation zone and at an elevated pressure to effect a separation of said first heavy phase into a second light phase comprising solvent and a second heavy phase comprising at least a portion of the hydrocarbonaceous material feed;

introducing said first light phase and a second portion of solvent into a third separation zone maintained at a temperature level above the temperature level in the first separation zone to effect a separation of the mixture into a third light phase comprising solvent and at least a portion of the hydrocarbonaceous material feed in said first light phase and a third heavy phase comprising the remainder of the hydrocarbonaceous material feed in said first light phase and some solvent;

introducing said third heavy phase into a fourth separation zone maintained at a temperature level above the temperature level in the third separation zone and at an elevated pressure level to effect a separation of said third heavy phase into a fourth light phase comprising solvent and a fourth heavy phase comprising at least a portion of the hydrocarbonaceous material feed in said third heavy phase;

recycling at least a portion of at least one member selected from the group consisting of the second light phase and the fourth light phase without substantial pressure reduction to provide at least a portion of at least one member selected from the group consisting of the first portion of solvent and the second portion of solvent; and recovering said second heavy phase and fourth heavy phase.

10. The process of claim 9 wherein the first separation zone is maintained at a temperature level of from about 150 degrees F. to above the critical temperature of the solvent and a pressure level at least equal to the vapor pressure of the solvent when at a temperature below the critical temperature of the solvent and at least equal to the critical pressure of the solvent when at a temperature equal to or above the critical temperature of the solvent.

11. The process of claim 9 wherein the solvent comprises at least one member selected from the group consisting of paraffinic hydrocarbons containing from 3 through 9 carbon atoms, mono-olefin hydrocarbons containing from 4 through 8 carbon atoms, aromatic hydrocarbons having a normal boiling point temperature below about 350 degrees F. and alcohols containing from 3 through 9 carbon atoms.

12. A process comprising:

introducing a hydrocarbonaceous material feed and a first portion of a solvent into a first separation zone maintained at an elevated temperature and pressure to effect a separation of the mixture into a first light phase comprising solvent and at least a portion of the hydrocarbonaceous material feed and some solvent;

introducing said first heavy phase into a second separation zone maintained at a temperature level above the temperature level in the first separation zone and at an elevated pressure to effect a separation of said first heavy phase into a second light phase comprising solvent and a second heavy phase comprising at least a portion of the hydrocarbonaceous material feed;

introducing said first light phase into a third separation zone maintained at a temperature level above the temperature level in the first separation zone to effect a separation of said first light phase into a third light phase comprising solvent and at least a portion of the hydrocarbonaceous material feed in said first light phase and a third heavy phase comprising the remainder of the hydrocarbonaceous material feed in said first light phase and some solvent;

introducing said third heavy phase into a fourth separation zone maintained at a temperature level above the temperature level in the third separation zone and at an elevated pressure level to effect a separation of said third heavy phase into a fourth light phase comprising solvent and a fourth heavy phase comprising at least a portion of the hydrocarbonaceous material feed in said third heavy phase;

introducing said third light phase and a second portion of solvent into a fifth separation zone maintained at a temperature level above the temperature level in the third separation zone to effect a separation of said third light phase into a fifth light phase comprising solvent and a fifth heavy phase comprising at least a portion of the hydrocarbonaceous feed material in said third light phase;

recycling at least a portion of at least one member selected from the group consisting of the second light phase and the fourth light phase without substantial pressure reduction to provide at least a portion of at least one member selected from the group consisting of the first portion of solvent and the second portion of solvent; and recovering said second heavy phase, fourth heavy phase and fifth heavy phase.

13. The process of claim 12 wherein the first separation zone is maintained at a temperature level of from about 150 degrees F. to above the critical temperature of the solvent and a pressure level at least equal to the vapor pressure of the solvent when at a temperature below the critical temperature of the solvent and at least equal to the critical pressure of the solvent when at a temperature equal to or above the critical temperature of the solvent.

14. The process of claim 12 wherein the solvent comprises at least one member selected from the group consisting of paraffinic hydrocarbons containing from 3 through 9 carbon atoms, mono-olefin hydrocarbons containing from 4 through 8 carbon atoms, aromatic hydrocarbons having a normal boiling point temperature below about 350 degrees F. and alcohols containing from 3 through 9 carbon atoms.

15. A process comprising:

introducing a hydrocarbonaceous material feed comprising asphaltenes, resins and oils and a solvent into a first separation zone maintained at an elevated temperature level and pressure level to effect a separation of the mixture into a first light phase comprising resins, oils and solvent and a first heavy phase comprising asphaltenes and some solvent;

introducing said first heavy phase into a second separation zone maintained at a temperature level above the temperature level in the first separation zone and at an elevated pressure level to effect a separation of said first heavy phase into a second light phase comprising solvent and a second heavy phase comprising asphaltenes;

withdrawing said second light phase from the second separation zone for recycle without substantial pressure reduction to said first separation zone to provide at least a portion of the solvent introduced therein;

introducing said first light phase into a third separation zone maintained at a temperature level above the temperature level in the first separation zone and at an elevated pressure level to effect a separation of said first light phase into a third light phase and a third heavy phase comprising resins and some solvent;

introducing said third heavy phase into a fourth separation zone maintained at a temperature level above the temperature level in the third separation zone and at an elevated pressure level to effect a separation of said third heavy phase into a fourth light phase comprising solvent and a fourth heavy phase comprising resins;

withdrawing said fourth light phase from the fourth separation zone for recycle without substantial pressure reduction to said first separation zone to provide at least a portion of the solvent introduced therein; and recovering said third light phase and fourth heavy phase.

16. The process of claim 15 wherein the pressure level in the second separation zone and fourth separation zone is above the critical pressure of the solvent.

* * * * *